US011740622B2

(12) United States Patent
Golgiri et al.

(10) Patent No.: US 11,740,622 B2
(45) Date of Patent: Aug. 29, 2023

(54) REMOTE TRAILER MANEUVER-ASSIST

(71) Applicant: Ford Global Technologies, LLC, Dearborn, MI (US)

(72) Inventors: Hamid M. Golgiri, Westland, MI (US); Erick Michael Lavoie, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 478 days.

(21) Appl. No.: 16/438,599

(22) Filed: Jun. 12, 2019

(65) Prior Publication Data

US 2020/0393826 A1 Dec. 17, 2020

(51) Int. Cl.
| | |
|---|---|
| *G05D 1/00* | (2006.01) |
| *B60W 10/18* | (2012.01) |
| *B60W 10/20* | (2006.01) |
| *B60W 10/04* | (2006.01) |
| *B60W 10/10* | (2012.01) |
| *B60W 30/18* | (2012.01) |

(52) U.S. Cl.
CPC ........... *G05D 1/0016* (2013.01); *B60W 10/04* (2013.01); *B60W 10/10* (2013.01); *B60W 10/18* (2013.01); *B60W 10/20* (2013.01); *B60W 30/18* (2013.01); *G05D 1/0044* (2013.01); *B60W 2300/14* (2013.01); *B60W 2556/45* (2020.02); *B60W 2710/10* (2013.01); *B60W 2710/18* (2013.01); *B60W 2710/20* (2013.01); *B60W 2720/106* (2013.01)

(58) Field of Classification Search
CPC ... G05D 1/0016; G05D 1/0044; B60W 10/18; B60W 10/20; B60W 10/04; B60W 10/10; B60W 30/18; B60W 2720/106; B60W 2300/14; B60W 2550/40; B60W 2710/20; B60W 2710/18; B60W 2710/10
See application file for complete search history.

(56) References Cited

U.S. PATENT DOCUMENTS

| | | | |
|---|---|---|---|
| 9,043,105 B2 * | 5/2015 | Suda ....................... | B60T 8/246 |
| | | | 701/70 |
| 9,290,204 B2 * | 3/2016 | Lavoie .................... | B60R 1/003 |
| 9,513,631 B2 | 12/2016 | Boos et al. | |
| 9,623,904 B2 * | 4/2017 | Lavoie .................. | B62D 6/002 |
| 10,053,110 B2 * | 8/2018 | Li ........................ | G06F 3/04883 |
| 10,435,070 B2 * | 10/2019 | Herzog ................... | B60D 1/06 |
| 10,496,102 B2 * | 12/2019 | Riefe .................. | G05D 1/0246 |

(Continued)

FOREIGN PATENT DOCUMENTS

WO 2015199600 A1 12/2015

OTHER PUBLICATIONS

Remote Control Range Rover Sport—Demonstration—YouTube (Year: 2015).*

(Continued)

*Primary Examiner* — Khoi H Tran
*Assistant Examiner* — Rodney P King
(74) *Attorney, Agent, or Firm* — Frank Lollo; Bejin Bieneman PLC

(57) ABSTRACT

A method includes, while detecting a continuous motion input in a first region of a touchscreen of a portable device in communication with a vehicle, detecting a steering input from a second region of the touchscreen, and actuating a steering component of the vehicle based on the steering input.

19 Claims, 7 Drawing Sheets

(56) References Cited

U.S. PATENT DOCUMENTS

| | | |
|---|---|---|
| 2007/0146347 A1* | 6/2007 | Rosenberg ............. G08C 17/02 |
| | | 345/173 |
| 2014/0215382 A1* | 7/2014 | Engel .................. G06F 3/04883 |
| | | 715/784 |
| 2014/0267688 A1 | 9/2014 | Aich et al. |
| 2016/0170494 A1 | 6/2016 | Bonnet et al. |
| 2018/0347254 A1 | 12/2018 | McNeill et al. |
| 2019/0037611 A1* | 1/2019 | Renn ................... G06F 3/04883 |

OTHER PUBLICATIONS

Park your Audi A8 with your phone while standing on the street—YouTube (Year: 2017).*
Panda Will (Super Cool WiFi Roadster RC Car—iOS & Android Controlled—PandaWill.com—YouTube) (Year: 2013).*
Panda Will, Super Cool WiFi Roadster RC Car—iOS & Android Controlled, Jun. 19, 2013 (Year: 2013).*
"Smart Trailer Parking—Reversing with trailer via smartphone", Press Information, Sep. 2013, ZF Lenksysteme GmbH.

* cited by examiner

REMOTE TRAILER MANEUVER-ASSIST

BACKGROUND

A vehicle may be equipped with a vehicle maneuvering feature, e.g., parking assist, braking assist, etc., in which at least one of the vehicle propulsion, braking, and steering are controlled by a computer. The computer may operate the vehicle based on inputs provided by a user, e.g., via an interface in the vehicle. The computer may display information from the vehicle maneuvering feature to the user, e.g., via the interface.

DETAILED DESCRIPTION

Figure 1:
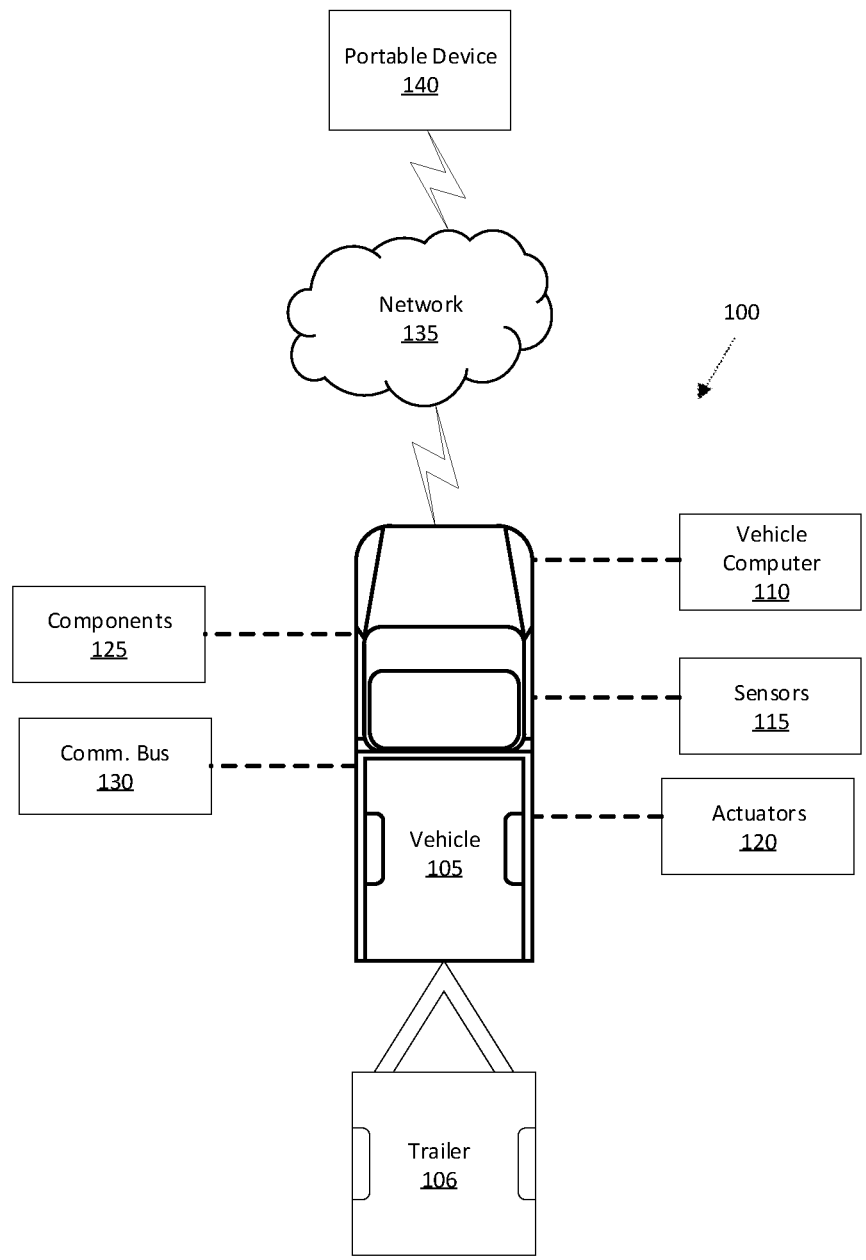
FIG. 1 is a diagram illustrating example remote trailer maneuver assist system.

A method includes while detecting a continuous motion input in a first region of a touchscreen of a portable device in communication with a vehicle, detecting a steering input from a second region of the touchscreen, and actuating a steering component of the vehicle based on the steering input.

The method can include, upon detecting the vehicle is stopped, displaying at least one of a gear selector and a speed selector in the second region.

The method can include actuating a propulsion component of the vehicle based on detecting a selection of an icon in the second region and detecting the continuous motion input in the first region.

The method can include actuating a brake component of the vehicle based on at least one of detecting a discontinuous motion input in the first region and detecting deselection of the icon in the second region.

The method can include operating the vehicle at a vehicle speed below an upper speed limit.

The method can include operating the vehicle at a vehicle speed below a lower speed limit based on detecting a trailer angle above a threshold.

The method can include, upon detecting a selection of an icon in the second region, detecting the continuous motion input in the first region.

The method can include detecting the continuous motion input based on detecting a speed of the continuous motion input above a threshold.

The second region can include an icon. The icon can be one of a knob, a slider, and a graphical image.

The steering input can include a steering direction and a steering angle.

A system can comprise a compute include a processor and a memory, the memory storing instructions executable by the processor to while detecting a continuous motion input in a first region of a touchscreen of a portable device in communication with a vehicle, detect a steering input from a second region of the touchscreen, and actuate a steering component of the vehicle based on the steering input.

The instructions can further include instructions to, upon detecting the vehicle is stopped, display at least one of a gear selector and a speed selector in the second region.

The instructions can further include instructions to actuate a propulsion component of the vehicle based on detecting a selection of an icon in the second region and detecting the continuous motion input in the first region.

The instructions can further include instructions to actuate a brake component of the vehicle based on at least one of detecting a discontinuous motion input in the first region and detecting deselection of the icon in the second region.

The instructions can further include instructions to operate the vehicle at a vehicle speed below an upper speed limit.

The instructions can further include instructions to operate the vehicle at a vehicle speed below a lower speed limit based on detecting a trailer angle above a threshold.

The instructions can further include instructions to, upon detecting a selection of an icon in the second region, detect the continuous motion input in the first region.

The instructions can further include instructions to detect the continuous motion input based on detecting a speed of the continuous motion input above a threshold.

The second region can include an icon. The icon can be one of a knob, a slider, and a graphical image.

The steering input can include a steering direction and a steering angle.

FIG. 1 is a block diagram of an example system 100, including a vehicle computer 110 programmed to, while detecting a continuous motion input in a first region 150 of a touchscreen 145 of a portable device 140 in communication with a vehicle 105, detect a steering input from a second region 155 of the touchscreen 145, and to actuate a steering component 125 of the vehicle 105 based on the steering input. The vehicle 105 may include a computer 110 programmed to execute one or more vehicle maneuvering assists that may be selected by a user, e.g., a parallel-parking assist, trailer maneuver assist, braking assist, etc. When the vehicle maneuvering assist is selected, the vehicle computer 110 may control one or more vehicle components 125 of the vehicle 105 to assist the user, e.g., in performing a selected maneuver. For example, during trailer maneuver assist, the vehicle determines steering and counter-steering angles while traveling in reverse to direct a trailer 106 along a curved path. Advantageously, the portable device 140 can allow the user to operate the trailer maneuver assist remotely, i.e., outside the vehicle 105, which allows the user to move around the vehicle 105 to avoid visibility constraints or limitations, and/or more reliably or accurately direct movement of the vehicle 105.

A vehicle 105 includes the vehicle computer 110, sensors 115, actuators 120 to actuate various vehicle components 125, and a vehicle communications bus 130. Via a network 135, the communications bus 130 allows the vehicle computer 110 to communicate with the portable device 140.

A trailer 106 is coupled to the vehicle 105, e.g., via a hitch, to facilitate transportation of objects from one location to another location. For example, the trailer 106 can be utilized to transport objects when storage areas within the vehicle 105 (e.g., trunks, flatbeds, passenger cabins, etc.) are unable to contain the objects. As used herein, a "trailer" refers to an object (e.g., a travel trailer, a recreational trailer, a disabled vehicle, a mobile home, etc.) that is attached, e.g., hitched, to the vehicle 105 such that the object will be towed behind the vehicle 105 when the vehicle 105 is moving in a forward direction.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle 105 network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, a human machine interface (HMI), etc. Alternatively, or additionally, in cases where the vehicle computer 110 actually comprises a plurality of devices, the vehicle 105 communication network may be used for communications between devices represented as the vehicle computer 110 in this disclosure. Further, as mentioned below, various controllers and/or sensors 115 may provide data to the vehicle computer 110 via the vehicle 105 communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105.

In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle 105 includes a trailer sensor 115 to monitor the position of the trailer 106 relative to the vehicle 105. For example, the trailer sensor 115 detects when the trailer 106 is coupled to a hitch of the vehicle 105. In such examples, the trailer sensor 115 may be a capacitive sensor, a piezoelectric sensor, a magnetoelastic sensor, and/or any other sensor configured to detect a coupling of the trailer 106 to the hitch. Additionally, or alternatively, the trailer sensor 115 detects a trailer angle formed between the trailer 106 and the vehicle 105 when the trailer 106 is coupled to the hitch. The trailer angle may be the relative angle between a longitudinal axis of the vehicle 105 and a longitudinal axis of the trailer 106.

The vehicle 105 actuators 120 are implemented via circuits, chips, or other electronic and or mechanical components that can actuate various vehicle subsystems in accordance with appropriate control signals as is known. The actuators 120 may be used to control vehicle components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of vehicle components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

The steering component 125 is operable in one of a left-turn position, a right-turn position, or a straight position. The vehicle computer 110 may be programmed to operate a steering controller of the vehicle 105, e.g., an ECU, to operate the steering component 125 in one of the positions. For example, the vehicle computer 110 may actuate the steering component 125 based on the steering input from the second region 155. The vehicle computer 110 can actuate the steering controller to operate the steering component 125 in the straight position to propel the vehicle 105 straight, e.g., along the longitudinal axis of the vehicle 105. The vehicle computer 110 can actuate the steering control to operate the steering component 125 in the left-turn position to turn the vehicle 105 to the left, e.g., relative to the longitudinal axis of the vehicle 105. The vehicle computer 110 can actuate the steering control to operate the steering component 125 in the right-turn position to turn the vehicle 105 to the right, e.g., relative to the longitudinal axis of the vehicle 105.

The transmission component 125 is engageable in one of a drive gear or a reverse gear. The vehicle computer 110 may be programmed to actuate a transmission controller of the vehicle 105, e.g., an ECU, to engage the transmission component 125 in one of the gears. For example, the vehicle computer 110 may actuate the transmission component 125 based on a gear selector 165 from the portable device 140 (as discussed further below). The vehicle computer 110 can actuate the transmission controller to engage the transmission component 125 in the drive gear to propel the vehicle 105 forward. The vehicle computer 110 can actuate the transmission controller to engage the transmission component 125 in the reverse gear to propel the vehicle 105 backwards, i.e., in reverse.

The vehicle computer 110 can, for example, communicate with the portable device 140 through wireless communications, e.g., Bluetooth®, Wi-Fi®, etc. The user can be external to the vehicle 105, i.e., not physically touching the vehicle 105, or in physical contact with the vehicle 105, e.g., sitting in a passenger cabin of the vehicle 105.

To prevent an intruder computer from controlling the vehicle 105, the vehicle computer 110 may be programmed to authenticate a portable device 140 that is activated to control the vehicle 105 operation. The vehicle computer 110 may be programmed to perform an authentication based on a key, e.g., a combination of numbers and/or characters, received from the portable device 140 upon communicating with the vehicle 105. In another example, the vehicle computer 110 may be programmed to receive, from the portable device 140, a request including an access code, e.g., a secret code known to certain parties such as vehicle distributors, e.g., dealers, for activating a vehicle 105 non-autonomous mode. The vehicle computer 110 may activate the vehicle 105 non-autonomous mode upon determining that the received access code matches an expected access code, e.g., based on stored information in the vehicle computer 110.

In one example, if the vehicle computer 110 determines that the received access code matches an expected access code, then the vehicle computer 110 may activate a vehicle 105 non-autonomous mode. For example, the vehicle computer 110 may be programmed to control the vehicle 105 operation based on commands received from the portable device 140. In another example, the vehicle computer 110 may additionally authenticate the portable device 140 after the access code is verified. Alternatively, the vehicle computer 110 may be programmed to first authenticate the portable device 140 and then proceed to verify the access code before activating a vehicle 105 non-autonomous mode.

Authentication of a digital communication or message as discussed herein means implementing a scheme for determining an authenticity (or lack thereof) of the communication or message, e.g., a message from the portable device 140 to the vehicle computer 110 indicating a steering input. Various known techniques such as an authentication signature (or digital signature) may be used for authentication. The vehicle computer 110 can conclude that the message was created by a known sender, e.g., a known portable device 140, upon detecting a valid authentication signature included in a received message.

For example, the portable device 140 may be programmed to perform the authentication by sending a message including an authentication signature to the vehicle computer 110. The authentication signature may be based on data, known to both parties, e.g., an identifier of a sender, a local time, etc., and/or an encryption/decryption key. Thus, a receiver can verify the authentication signature based on the encryption key, the decryption key, and/or the known data such as the portable device 140 identifier.

The vehicle computer 110 may be programmed to receive a message sent from the portable device 140 and authenticate the portable device 140 based on the authentication signature. In one example, the vehicle computer 110 may be programmed to authenticate the portable device 140 based on data stored in the vehicle computer 110 or otherwise accessible by the vehicle computer 110. For example, the vehicle computer 110 may authenticate the portable device 140 by determining whether the authentication signature is included in a list of valid authentication signatures stored in the vehicle computer 110 or a memory accessible by the vehicle computer 110. In another example, the vehicle computer 110 may determine an expected signature for the respective portable device 140, e.g., a combination of an identifier of the known portable device 140 and current time and verify whether the authentication signature of the received message includes the expected signature. In another example, the vehicle computer 110 may determine the expected signature based on a result of an operation, e.g., multiplication, of a portable device 140 identifier, current time, etc. In other words, the vehicle computer 110 may be aware of how the portable device 140 determines its authentication signature.

A user can provide a motion input to the first region 150 of the touchscreen 145. A motion input is input, e.g., from a user's finger, specifying a line extending a distance on the touchscreen 145 within the first region 150. For example, the user can press the touchscreen 145 with a finger and move the finger around the first region 150 of the touchscreen 145 along any line, e.g., a straight line, a curved line, a zig-zag line, etc. The motion input can be one of a substantially continuous motion input or a discontinuous motion input based on a speed of the motion input, as discussed below. The touchscreen 145 stops receiving a motion input when the user removes the finger from, i.e., releases or stops touching, the first region 150 of the touchscreen 145.

A continuous motion input is input of a line that has a distance increasing with time, and a speed of the motion input is, and remains, above a threshold, or the speed of the motion input is nonzero but is below the threshold for less than a predetermined time. That is, the predetermined time is established to allow the user to briefly slow the motion input, or be inconsistent in a speed of the motion input, without preventing the motion input from being recognized as continuous.

On the other hand, if the user slows the motion input below a threshold speed, or stops it altogether even while maintaining a finger on the touchscreen 145, then the motion input is recognized as discontinuous. A discontinuous motion input is input of a line that has a constant distance for the predetermined time. The motion input is a discontinuous motion input when the speed of the motion input is below the threshold for more than the predetermined time. The predetermined time is determined to detect substantially continuous motion input despite the speed of the motion input momentarily dropping below the threshold, e.g., when a user changes a direction of the motion input. The predetermined time can be determined through empirical testing and observation of user behavior.

When the motion input is recognized as continuous, the vehicle computer 110 is programmed to control one or more vehicle components 125 to operate the vehicle 105 and the trailer 106. Conversely, when the motion input is recognized as discontinuous, the vehicle computer 110 is programmed to control one or more vehicle components 125 to stop the vehicle 105 and the trailer 106. One of the vehicle computer 110 or the portable device 140 can determine whether the motion input is a substantially continuous motion input (as discussed below).

The vehicle computer 110 can control the steering of the vehicle 105 and the trailer 106 along a simplified path based on the steering input in the second region 155. For example, a user may provide a steering input by engaging an icon 160 (as discussed below), in the second region 155, which includes a steering angle and a steering direction to steer the vehicle 105 and the trailer 106 along the path. In other words, the steering input indicates a path along which to steer the vehicle 105 and the trailer 106. In this situation, the user inputs the steering input in the second region 155, i.e., specifying the desired path, to the portable device 140 and the vehicle computer 110 can translate the steering input into the steering commands for the steering component 125 to steer and counter-steer both the vehicle 105 and the trailer 106 along the path. That is, the vehicle computer 110 can actuate the steering component 125 to operate between the right-turn position, the straight position, and the left-turn position to steer the vehicle 105 and the trailer 106 along the path based on the steering input in the second region 155. The path may include a curvature threshold. The curvature threshold is a maximum curvature path, i.e., smallest radius, along which the vehicle computer 110 can steer the vehicle 105 and the trailer 106. The curvature threshold may be determined based on at least one of the gear of the transmission component 125 or a distance between a hitch ball and a trailer axle.

The user can press a finger against the icon 160 and move the icon 160 relative to the longitudinal axis A of the touchscreen 145 to provide the steering input in the second region 155. In this example, the vehicle computer 110 determines the steering direction based on the direction the user moves the icon 160 relative to a longitudinal axis A of the touchscreen 145. The portable device 140 can transmit a direction the icon 160 moves relative to the longitudinal axis A of the touchscreen 145 to the vehicle computer 110. Alternatively, the portable device 140 can determine the steering direction based on the direction the user moves the icon 160 relative to a longitudinal axis A of the touchscreen 145. In these circumstances, the portable device 140 can transmit the steering direction to the vehicle computer 110.

For example, the user may move the icon 160 in one of a clockwise direction or a counterclockwise direction relative to the longitudinal axis A of the touchscreen 145. When the user moves the icon 160 in the clockwise direction while providing a substantially continuous motion input (see FIG. 2A), the vehicle computer 110 is programmed to actuate the steering component 125 to steer the vehicle 105 and the trailer 106 along a path to the right. Conversely, when the user moves the icon 160 in the counterclockwise direction while providing a substantially continuous motion input (see FIG. 2C), the vehicle computer 110 is programmed to actuate the steering component 125 to steer the vehicle 105 and the trailer 106 along a path to the left. When the user moves the icon 160 onto the longitudinal axis A of the touchscreen 145 while providing a substantially continuous motion input (see FIG. 2B), the vehicle computer 110 is programmed to actuate the steering component 125 to steer the vehicle 105 and the trailer 106 along a substantially straight path.

Additionally, the vehicle computer 110 can, for example, determine the steering angle based on a distance the icon 160 moves relative to the longitudinal axis A of the touchscreen 145. That is, the vehicle computer 110 determines an amount to steer the vehicle 105 and the trailer 106 relative to a straight path. The portable device 140 can, for example, transmit the distance the icon 160 moves relative to the longitudinal axis A of the touchscreen 145 to the vehicle computer 110. The distance is a screen distance determined from the longitudinal axis A of the touchscreen 145 to the icon 160. For example, the portable device 140 can include a sensor that detects a user's finger in the second region 155. The sensor can determine the distance along the touchscreen 145 from the user's finger to the longitudinal axis A of the touchscreen 145 in the second region 155. The distance can be an angular distance the icon 160 is rotated about an axis transverse to the longitudinal axis A of the touchscreen 145. As another example, the distance can be a linear distance along a lateral axis (not shown) transverse to the longitudinal axis A of the touchscreen 145. Alternatively, the portable device 140 can determine the steering angle based on a distance the icon 160 moves relative to the longitudinal axis A of the touchscreen 145. In these circumstances, the portable device 140 can transmit the steering angle to the vehicle computer 110. The vehicle computer 110 then can actuate the steering component 125 to increase the steering angle (i.e., turn further away from the straight position) when the distance increases relative to the longitudinal axis A of the touchscreen 145, and to decrease the steering angle (i.e., turn towards the straight position) when the distance decreases relative to the longitudinal axis A of the touchscreen 145. When the steering angle is increased, a turning radius of the vehicle 105 is decreased, which increases a curvature of the path of the vehicle 105 and the trailer 106. When the steering angle is decreased, a turning radius of the vehicle 105 is increased, which decreases a curvature of the path of the vehicle 105 and the trailer 106.

In addition, the vehicle computer 110 may be configured for communicating via a vehicle-to-vehicle communication bus 130 or interface with devices outside of the vehicle 105, e.g., through a vehicle-to-vehicle (V2V) or vehicle-to-infrastructure (V2X) wireless communications to another vehicle, and/or to the portable device 140 (typically via direct radio frequency communications). The communications bus 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications bus 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with the portable device 140. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The portable device 140 includes a supporting or enclosing structure, such as a housing or other support structure on or in which sensors, as well as a communications module, computer, and input means can be housed, mounted, stored, and/or contained and powered, etc. The portable device 140 is moveable by a user to multiple locations separate from the vehicle 105. Although not shown for ease of illustration, the portable device 140 also includes a power source such as a battery.

The portable device 140 can determine a speed of the motion input, e.g., a speed at which a user's finger moves relative to the touchscreen 145. The portable device 140 may include a sensor that detects the motion input in the first region 150. That is, the sensor may detect the speed of the motion input, i.e., the speed of a finger of the user that is pressing the touchscreen 145 and moving relative to the touchscreen 145. For example, the sensor can detect a first position and a second position of the user's finger on the touchscreen 145 and associated time stamps that the user's finger is in the first position and the second position, respectively. As one example, the portable device 140 can determine the speed of the motion input using the following equation:

$$s = \frac{\sqrt{(x_2 - x_1)^2 + (y_2 - y_1)^2}}{t_2 - t_1}$$

Figure 2A:
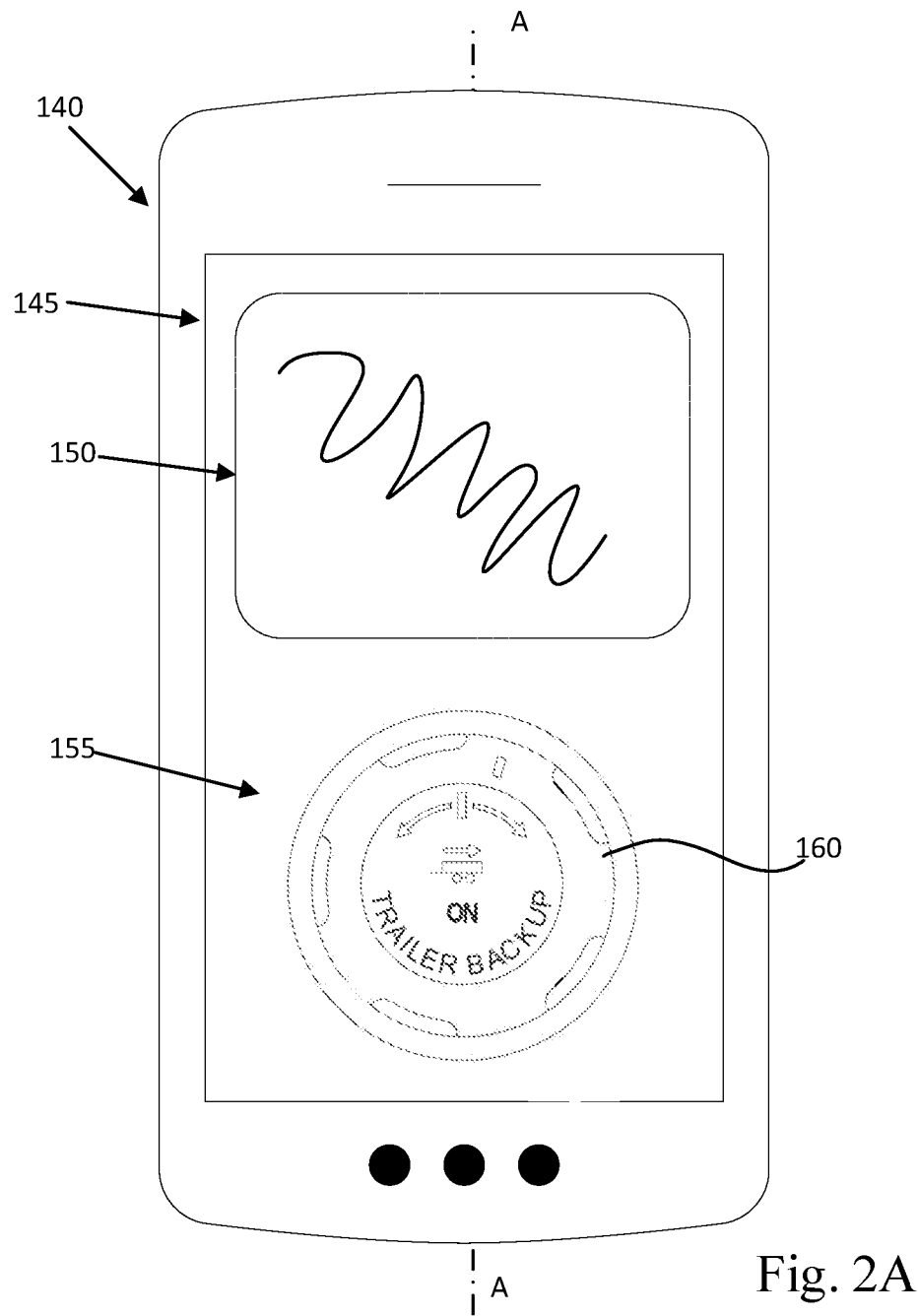
FIG. 2A is a diagram illustrating an example touchscreen of a portable device.
Figure 2B:
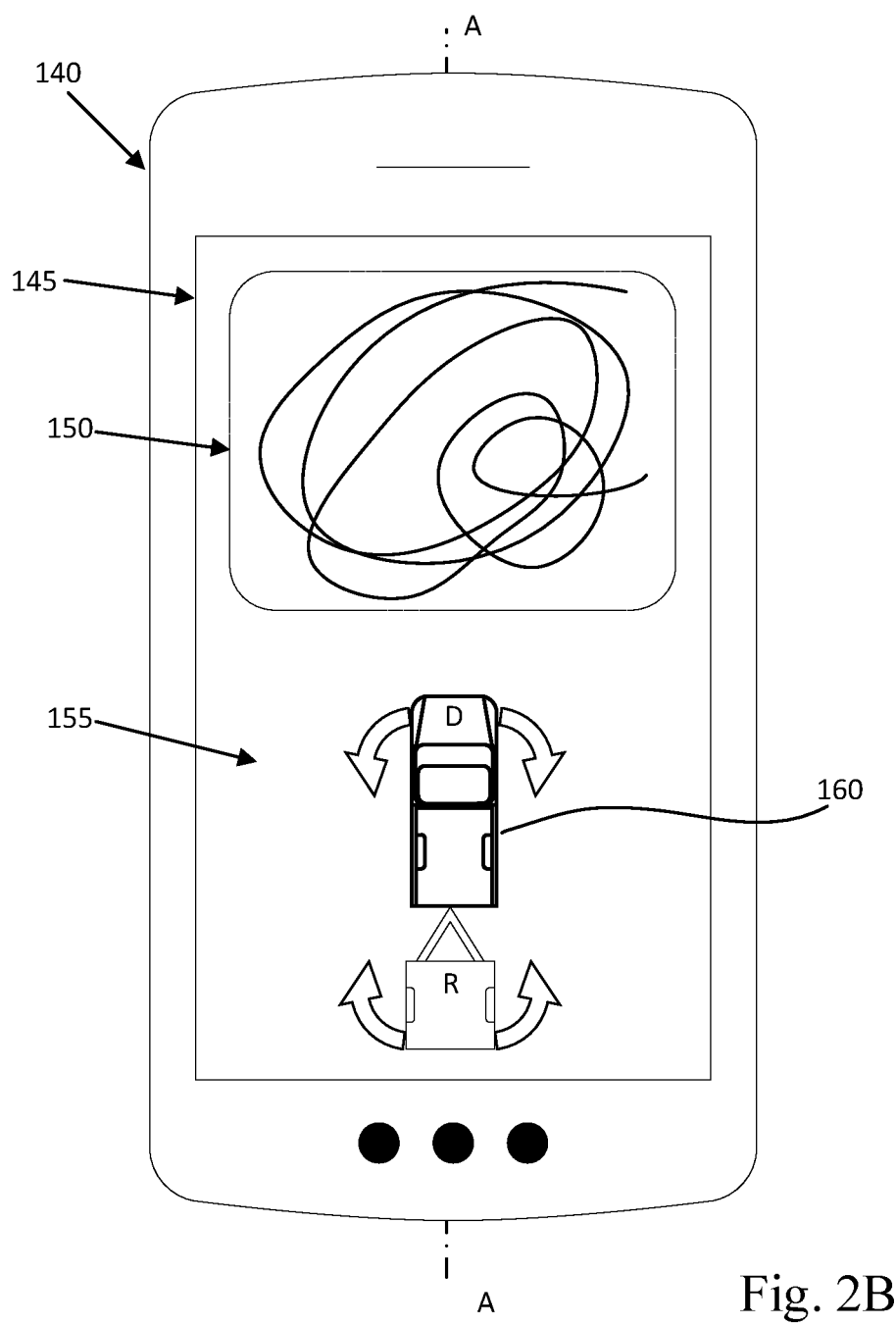
FIG. 2B is a diagram illustrating another example touchscreen of the portable device.
Figure 2C:
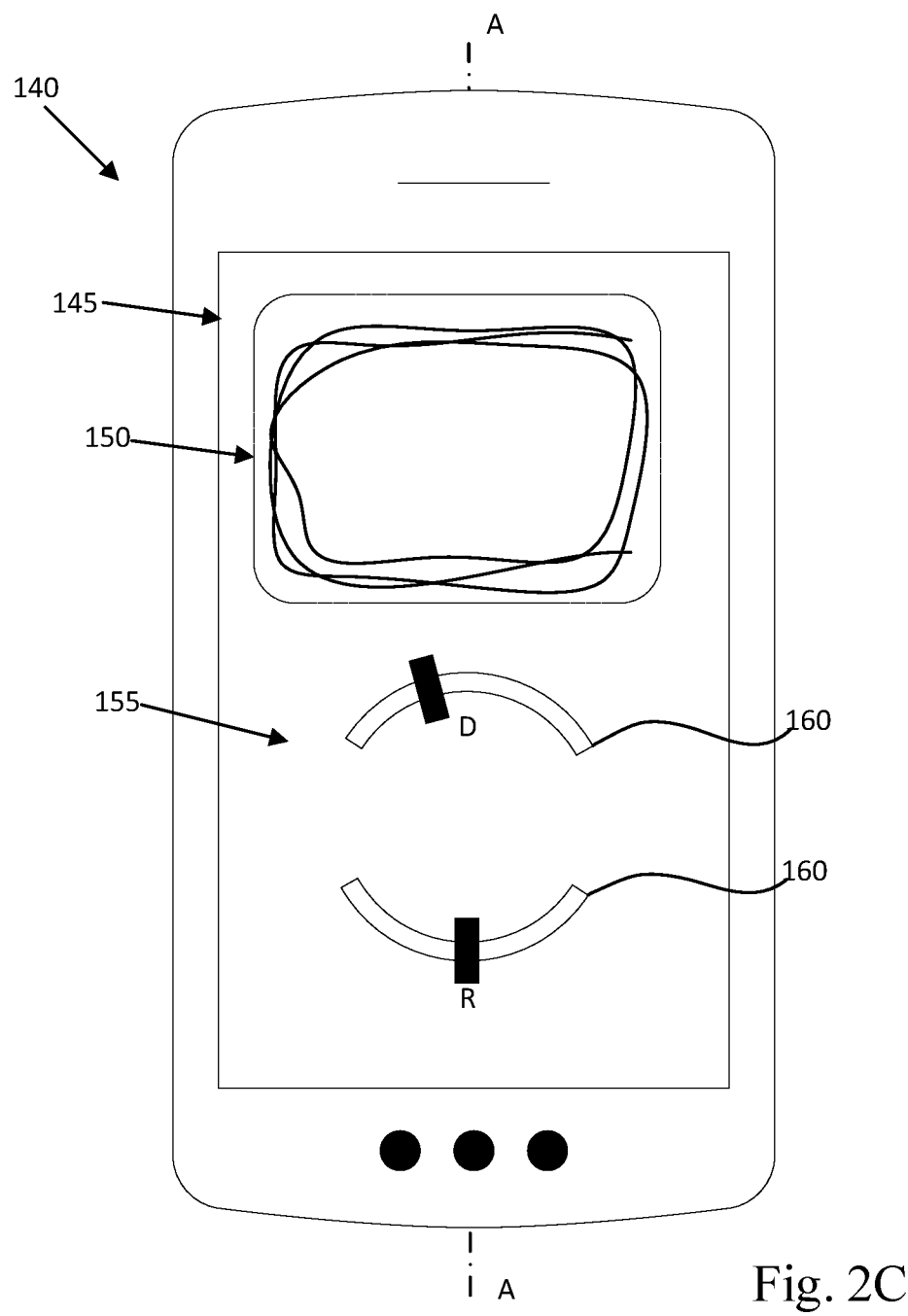
FIG. 2C is a diagram illustrating another example touchscreen of the portable device.

In the above equation, the term "s" is the speed of the motion input, the terms "$x_1$" and "$x_2$" are x-coordinates of the first position and the second position, respectively, of the finger of the user in the first region 150, the terms "$y_1$" and "$y_2$" are y-coordinates of the first position and the second position, respectively, of the finger of the user in the first region 150, and the term "$t_n$" is the time at which the x-coordinate and the y-coordinate are determined. As another example, the speed of the motion input can be determined by one of an angular velocity or a tangential velocity of a finger of the user. The angular velocity is determined by the velocity of the finger of the user along a path of the motion input. In other words, the sensor can determine an angle about a center of the touchscreen 145 the user's finger moved along the touchscreen 145 from the first position to the second position and a time duration of the movement from the first position to the second position The tangential velocity is determined by the velocity of the finger of the user tangent to the path of the motion input. In other words, the sensor can determine an arc length about the center of the touchscreen 145 the user's finger moved along the touchscreen 145 from the first position to the second position and a time duration of the movement from the first position to the second position The motion input may follow any suitable path in the first region 150, circular, zigzag, etc. Non-limiting examples of paths of the substantially continuous motion input are shown in FIGS. 2A-2C.

The portable device 140 can determine the icon 160 is selected, i.e., pressed, in the second region 155. For example, the portable device 140 may include a sensor that detects a user, e.g., a finger of one hand, is pressing the icon 160 in the second region 155 of the touchscreen 145. Similarly, the portable device 140, e.g., the sensor, can detect the icon 160 is deselected, i.e., released. The vehicle computer 110 is programmed to actuate vehicle components 125, e.g., the brake component 125, to stop the vehicle 105 when the icon 160 is deselected.

Additionally, the portable device 140 can receive and determine the steering input. For example, the sensor can detect the user's finger moving relative to the longitudinal axis A of the touchscreen 145 while pressing the icon 160. That is, the icon 160 moves with the user's finger on the touchscreen 145. The portable device 140 determines the steering input based on the movement of the finger of the user while pressing the icon 160. For example, the portable device 140 determines the steering direction based on the user's finger moving the icon 160 to the right or the left relative to the longitudinal axis A of the touchscreen 145. Additionally, the portable device 140 determines the steering angle by the distance the user's finger moves the icon 160 relative to the longitudinal axis A of the touchscreen 145.

The portable device 140 can be programmed or configured so that the first region 150 and the second region 155 can be engaged simultaneously to activate the portable device 140. In other words, the portable device 140 may only communicate with the vehicle computer 110 to actuate vehicle components 125 to move the vehicle 105 upon detecting the substantially continuous motion input in the first region 150 and the icon 160 is pressed in the second region 155. For example, the portable device 140 can detect that the icon 160 is pressed or selected prior to detecting the motion input in the first region 150. In these circumstances, the first region 150 may be deactivated until the portable device 140 detects the icon 160 is pressed in the second region 155. In these circumstances, the portable device 140 may activate the first region 150 only upon detecting the icon 160 is pressed. Alternatively, the portable device 140 can detect the icon 160 is pressed upon detecting the motion input in the first region 150. In these circumstances, the second region 155 may be deactivated until the portable device 140 detects a substantially continuous motion input in the first region 150. In these circumstances, the portable device 104 may active the second region only upon detecting a substantially continuous motion input in the first region 150.

The system 100 can determine whether the motion input is a continuous motion input or a discontinuous motion input. Once the icon 160 is pressed and the portable device 140 detects a motion input in the first region 150, one of the portable device 140 and the vehicle computer 110 can compare the speed of the motion input to a threshold. The threshold is a minimum speed of the motion input at which the vehicle computer 110 is permitted to communicate with the portable device 140 to actuate vehicle components 125 to move the vehicle 105. The threshold can be one of an angular velocity, a tangential velocity, or a linear velocity, and can be determined based on empirical testing to determine the minimum speed at which users provide motion input to control the vehicle 105. The portable device 140 can, for example, transmit the speed of the motion input, as discussed above, to the vehicle computer 110, and the vehicle computer 110 compares the speed of the motion input to the threshold. Alternatively, the portable device 140 can compare the speed of the motion input to the threshold and transmit a message to the vehicle computer 110 identifying a substantially continuous motion input or a discontinuous motion input. When the speed of the motion input is above the threshold, one of the portable device 140 or the vehicle computer 110 determines the motion input is a substantially continuous motion input, and the vehicle computer 110 is programmed to actuate vehicle components 125, e.g., the steering component 125, the propulsion component 125, etc., to move the vehicle 105 based on the steering input.

One of the portable device 140 and the vehicle computer 110 can activate a timer that measures an elapsed time that the speed of the motion input is below the threshold. When the speed of the motion input is below the threshold for less than a predetermined time, i.e., prior to the expiration of the timer, one of the portable device 140 or the vehicle computer 110 determines that the motion input is a substantially continuous motion input. In these circumstances, the vehicle computer 110 is programmed to actuate vehicle components 125, e.g., the steering component 125, the propulsion component 125, etc., to move the vehicle 105 based on the steering input. Conversely, when the speed of the motion input is below the threshold for the predetermined time, i.e., when the timer expires, one of the portable device 140 or the vehicle computer 110 determines the motion input is a discontinuous motion input. In these circumstances, the vehicle computer 110 is programmed to actuate the vehicle components 125, e.g., the brake component 125, to stop the vehicle 105.

The vehicle computer 110 controls a vehicle speed of the vehicle 105 and the trailer 106, e.g., based on at least one of a speed of the substantially continuous motion input and a trailer angle. The vehicle computer 110 can actuate the propulsion component 125 to operate the vehicle 105 at a vehicle speed based on the speed of the substantially continuous motion input in the first region 150. For example, the vehicle computer 110 actuates the propulsion component 125 to increase the vehicle speed when the speed of the substantially continuous motion input in the first region 150 increases, and to decrease the vehicle speed when the speed of the substantially continuous motion input in the first region 150 decreases. That is, when the speed of the substantially continuous motion input in the first region 150 is increased, the vehicle computer 110 actuates the propulsion component 125 to increase the vehicle speed, i.e., propel the vehicle 105 faster.

Additionally, or alternatively, the vehicle computer 110 may operate the vehicle 105 at the vehicle speed based on the trailer angle. The vehicle computer 110 can compare the trailer angle to a threshold. The threshold is a maximum trailer angle at which the vehicle computer 110 operates the vehicle 105 at a vehicle speed above a lower speed limit. For example, when the trailer angle is above the threshold, the vehicle computer 110 operates the vehicle 105 at a vehicle speed at or below the lower speed limit. When the trailer angle is below the threshold, the vehicle computer 110 operates the vehicle 105 at a vehicle speed at or below an upper speed limit. The upper speed limit is greater than the lower speed limit. In other words, the vehicle computer 110 can operate the vehicle 105 at a faster speed when the trailer angle is below the threshold as compared to when the trailer angle is above the threshold.

Turning to FIG. 2A, the portable device 140 can be any one of a variety of computers that can be used while carried by a person, e.g., a smartphone, a tablet, a personal digital assistant, a smart watch, etc. The portable device 140 may communicate with the vehicle communications bus 130 via wireless communication. For example, the portable device 140 can be communicatively coupled to the vehicle communications bus 130 with wireless technologies such as described above. In other words, the portable device 140 can communicate with the vehicle communications bus 130, e.g., using Bluetooth®, Bluetooth® Low Energy (BLE), IEEE 802.11, vehicle-to-vehicle (V2V) such as Dedicated Short Range Communications (DSRC), etc.

The portable device 140 includes a processor programmed to run one or more applications stored in a memory. An "application" is programming stored in the memory that includes instructions that the processor executes to perform an operation. For example, the application can be a remote trailer maneuver assist (ReTMA) application that includes instructions to transmit data from the portable device 140 to the vehicle computer 110 and to receive data from the vehicle computer 110. That is, the ReTMA application includes instructions for the portable device 140 to communicate with the vehicle computer 110. Example communications by the ReTMA application includes, e.g., transmission of steering input from the portable device 140 to the vehicle computer 110, transmission of vehicle 105 operating parameters (i.e., transmission gear, speed, trailer angle, etc.) from the vehicle computer 110 to the portable device 140, etc. As used herein, "remote trailer maneuver assist" refers to a trailer maneuver assist system that enables a user to control operation of a vehicle from a remote location, e.g., via a portable device 140, relative to the vehicle 105.

The portable device 140 may include various input means. For example, the input means may be buttons, sliders, knobs, graphical images, etc. displayed on the touchscreen 145. In other words, the input means are virtually presented on the touchscreen 145 and respond to inputs provided by the user touching the virtual input means.

The input means can include the first region 150, the second region 155, a gear selector 165, and a speed selector 170. The first region 150 and the second region 155 are displayed on the touchscreen 145 (see FIGS. 2A-2D). The first region 150 and the second region 155 each are engageable by a user, e.g., by pressing a finger of one respective hand against the touchscreen 145 in the respective region 150, 155, to provide the substantially continuous motion input and steering input, respectively. That is, the user provides substantially continuous motion input and a steering input simultaneously to control the direction the vehicle 105 travels, e.g., straight, left turn, or right turn. The user provides a substantially continuous motion input in the first region 150 in any path. When the user provides motion input at a speed above the threshold (i.e., substantially continuous motion input) and a steering input, e.g., via the icon 160, the portable device 140 transmits signals to the vehicle computer 110. The vehicle computer 110 is programmed to actuate the steering component 125 to operate the vehicle 105 in one of the straight position, the left-turn position, or the right-turn position based on the steering input. When the speed of the motion input is below the threshold (e.g., the user removes the finger from the touchscreen 145) or the icon 160 is released, the portable device 140 transmits a signal to the vehicle computer 110, and the vehicle computer 110 is programmed to actuate a brake component 125, e.g., to stop the vehicle 105.

The first region 150 and the second region 155 may be a same or different size. In other words, the first region 150 and the second region 155 may encompass substantially a same or a different amount of surface area of the touchscreen 145. The first region 150 and the second region 155 may be, e.g., orientated side-by-side, orientated in a stacked configuration, etc. The first region 150 may include a boundary. The portable device 140 may detect a motion input only within the boundary of the first region 150. The boundary of the first region 150 may be displayed on the touchscreen 145 (see FIGS. 2A-2D).

The device 140 is programmed to receive steering input as selection and movement of the icon 160. For example, while pressing the icon 160, the user can move a finger along the touchscreen 145 to provide the steering input. That is, the icon 160 may be moved relative to the longitudinal axis A of the touchscreen 145 based on movement of the finger of the user in the second region 155. When the finger is moved to the right of the longitudinal axis A of the touchscreen 145, the vehicle computer 110 can actuate the steering component 125 to turn the vehicle 105 to the right. When the finger is moved to the left of the longitudinal axis A of the touchscreen 145, the vehicle computer 110 can actuate the steering component 125 to turn the vehicle 105 to the left. When the finger is moved onto the longitudinal axis A of the touchscreen 145, the vehicle computer 110 can actuate the steering component 125 to operate the vehicle 105 on a straight path. Additionally, when the icon 160 is released, the icon 160 may return to the longitudinal axis A of the touchscreen 145. In other words, the icon 160 may default to a position on the longitudinal axis A of the touchscreen 145 when not being pressed or selected by the user. The icon 160 may, for example, be a control knob that is rotatable about an axis transverse to the longitudinal axis A of the touchscreen 145 (see FIG. 2A), a graphical image of the vehicle 105 and the trailer 106 (see FIG. 2B) each selectively pivotable about an axis transverse to the longitudinal axis A of the touchscreen 145, a drive slider and a reverse slider (see FIG. 2C) each slidable transverse to the longitudinal axis A of the touchscreen 145, a virtual steering wheel, etc.

Figure 2D:
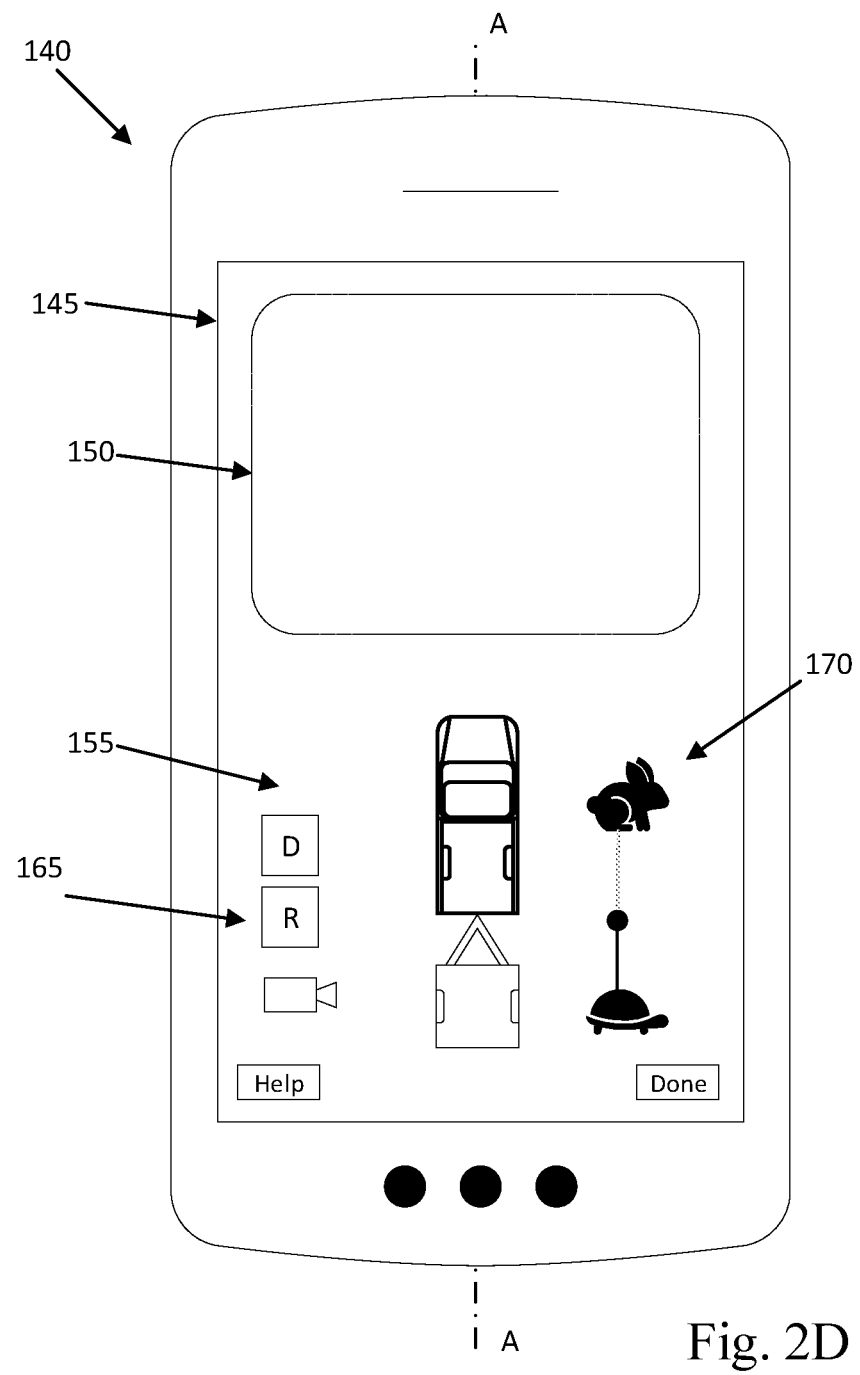
FIG. 2D is a diagram illustrating another example touchscreen of the portable device.

The gear selector 165 may be displayed on the touchscreen 145 when the vehicle 105 is stopped (see FIG. 2D). In other words, the user can engage with the gear selector 165 when the vehicle 105 is stationary. That is, the portable device 140 displays the gear selector 165 on the touchscreen 145 only upon the vehicle computer 110 determining the vehicle 105 is stopped and transmitting a signal to the portable device 140. For example, the gear selector 165 can include a forward button and a reverse button. When the user presses the reverse button, the vehicle computer 110 receives signals from the portable device 140 and actuates the transmission component 125 to engage in the reverse gear. In these circumstances, the icon 160 may be the virtual control knob, as shown in FIG. 2A. When the user presses the forward button, the vehicle computer 110 receives signals from the portable device 140 and actuates the transmission component 125 to engage in the drive gear. In these circumstances, the icon 160 may be a virtual steering wheel. That is, the icon 160 can change, e.g., between a virtual control knob and a virtual steering wheel, based on the gear of the transmission component 125, i.e., the direction of travel of the vehicle 105 and the trailer 106. Alternatively, the icon 160 can include the gear selector 165. That is, the user may select the gear selector 165 when the user touches the icon 160. In these circumstances, the user may provide input instructing the vehicle computer 110 to actuate the transmission component 125 in one of the drive gear or the reverse gear and to actuate the steering component 125 based on the steering input. For example, the icon 160 can include a graphical image of the vehicle 105 and the trailer 106 (see FIG. 2B). In these circumstances, the user may select one of the graphical image of the vehicle 105 or the graphical image of the trailer 106. When the user selects the graphical image of the vehicle 105, the vehicle computer 110 is programmed to actuate the transmission component 125 to engage the in the drive gear. When the user selects the graphical image of the trailer 106, the vehicle computer 110 is programmed to actuate the transmission component 125 to engage in the reverse gear. When the user selects one of the graphical images, the user may rotate the graphical image relative to the longitudinal axis A of the touchscreen 145, which provides the steering input. As another example, the icon 160 can include a drive slider and a reverse slider (see FIG. 2C). In these circumstances, the user may select one of the drive slider or the reverse slider. When the user selects the drive slider, the vehicle computer 110 is programmed to actuate the transmission component 125 to engage the in the drive gear. When the user selects the reverse slider, the vehicle computer 110 is programmed to actuate the transmission component 125 to engage in the reverse gear. When the user selects one of the sliders, the user may move the slider relative to the longitudinal axis A of the touchscreen 145, which provides the steering input.

The speed selector 170 is displayed on the touchscreen 145 when the vehicle 105 is stopped (see FIG. 2C). In other words, the user can engage with the speed selector 170 only when the vehicle 105 is stationary. That is, the portable device 140 displays the speed selector 170 on the touchscreen 145 only upon the vehicle computer 110 determining the vehicle 105 is stopped and transmitting a signal to the portable device 140. For example, the speed selector 170 can include a slider moveable across a range from a slow setting to a fast setting. The slow setting may represent a minimum vehicle speed at which the vehicle computer 110 can operate the vehicle 105 while towing the trailer 106, and the fast setting may represent a maximum vehicle speed at which the vehicle computer 110 can operate the vehicle 105 while towing the trailer 106. That is, the position of the slider within the range corresponds to a vehicle speed between the minimum speed and the maximum speed at which the vehicle computer 110 can operate the vehicle 105 while towing the trailer 106. The slow setting corresponds to a slower vehicle speed than the fast setting. The fast setting may be based on the trailer angle. For example, when the trailer angle is below the threshold, the fast setting may represent a vehicle speed at or below the upper speed limit. Conversely, when the trailer angle is above the threshold, the fast setting may represent a vehicle speed at or below the lower speed limit. As another example, the speed selector 170 can include a dial selectively rotatable across a range from a fast setting to a slow setting, two buttons selectively engageable and representing one of the fast setting or the slow setting, respectively, two graphical images selectively engageable and representing one of the fast setting or the slow setting, respectively, etc. The vehicle computer 110 is programmed to actuate the propulsion component based on the speed selector 170 and the trailer angle.

The portable device 140 can detect the speed of the substantially continuous motion input in the first region 150. For example, the sensor of the portable device 140 may detect the speed of the finger of the user as the finger moves around the first region 150. The portable device 140 can transmit the speed of the substantially continuous motion input to the vehicle computer 110. When the speed of the substantially continuous motion input is above the input speed threshold, the vehicle computer 110 is programmed to actuate the propulsion component 125 to operate the vehicle 105 at a vehicle speed, e.g., based on the speed selector 170 and the trailer angle. When the speed of the substantially continuous motion input is below the input speed threshold, the vehicle computer 110 is programmed to actuate a brake component 125, e.g., to stop the vehicle 105.

The portable device 140 can detect the direction and the distance the icon 160 moves, as discussed above, relative to the longitudinal axis A of the touchscreen 145. For example, the portable device 140 can include a sensor that may detect a finger is pressing the touchscreen 145, e.g., the icon 160, and may detect the finger sliding along the touchscreen 145 relative to the longitudinal axis A of the touchscreen 145 in the second region 155. In these circumstances, the sensor may determine the distance between the finger of the user and the longitudinal axis A of the touchscreen 145, i.e., the distance the icon 160 moves, and the direction the finger moved relative to the longitudinal axis A of the touchscreen 145. The distance the icon 160 moves increases as the user's finger moves away from the longitudinal axis A of the touchscreen 145 and decreases as the user's finger moves towards the longitudinal axis A of the touchscreen 145. That is, the distance the icon 160 moves is determined from the longitudinal axis A of the touchscreen 145 to the user's finger. The portable device 140 can transmit the direction and the distance the icon 160 moves relative to the longitudinal axis A of the touchscreen 145 to the vehicle computer 110. The vehicle computer 110 can be programmed to determine the steering input based on the direction and the distance the icon 160 moves relative to the longitudinal axis A of the touchscreen 145 and to actuate the vehicle components 125 based on the steering input. For example, the vehicle computer 110 is programmed to actuate the steering component 125 one of the right-turn position or the left-turn position when the icon 160 moves to the right, e.g., in a clockwise direction, or the left, e.g., in a counterclockwise direction, respectively, relative to the longitudinal axis A of the touchscreen 145. Additionally, the vehicle computer 110 is programmed to actuate the steering component 125 to increase the steering angle when the distance the icon 160 moves relative to the longitudinal axis A of the touchscreen 145 increases and to decrease the steering angle when the distance the icon 160 moves relative to the longitudinal axis A of the touchscreen 145 decreases. That is, the steering angle may have a linear relationship with the distance the icon 160 moves relative to the longitudinal axis A of the touchscreen 145. Alternatively, the portable device 140 can determine the steering input based on the direction and the distance the icon 160 moves relative to the longitudinal axis A of the touchscreen 145 and transmit the steering input to the vehicle computer 110.

The portable device 140 may be programmed, e.g., via software and/or firmware, to receive user inputs, e.g., the gear selector 165, the speed selector 170, the steering input in the second region 155, the substantially continuous motion input in the first region 150, etc. In response to a user input, the portable device 140 may transmit data, representing the user input, to the vehicle computer 110. The vehicle computer 110 may generate commands based on the user input to actuate the steering controller, e.g., to operate the steering component 125 in one of the positions based on the steering input and the substantially continuous motion input, to operate the propulsion component 125 based on the speed selector 170 and/or the trailer angle, to operate the transmission component 125 based on the gear selector 165, etc.

Figure 3:
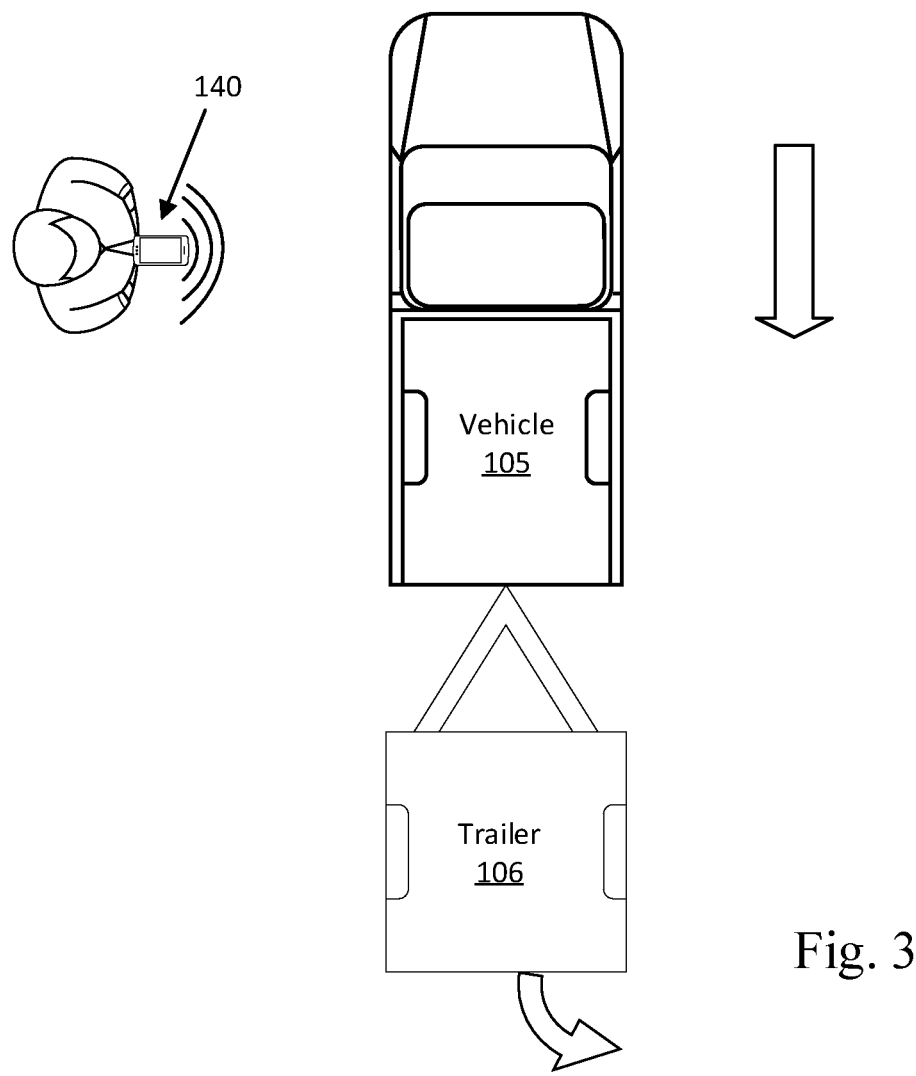
FIG. 3 is a diagram illustrating an example remote trailer maneuver assist application.

Turning to FIG. 3, the portable device 140 can be provided to control the vehicle 105 during operation while maneuvering a trailer 106. For example, the vehicle 105 could be maneuvering a trailer 106 to park the trailer at a location, e.g., a parking lot, a garage, a loading dock, a boat launch, etc.

FIG. 3 is a block diagram illustrating the portable device 140 controlling the vehicle 105 while the vehicle 105 is towing a trailer 106. At some points during operation, obstacles may be present around the vehicle 105. At such times, the user may not be able to view the obstacles while sitting in the cabin of the vehicle 105. As such, the user may control the vehicle 105 with the portable device 140 so the user may move around the vehicle 105 to view potential obstacles.

The vehicle computer 110 is programmed to detect the portable device 140 is activated, e.g., a ReTMA application is operating, the icon 160 is pressed, and a substantially continuous motion input is input in the first region 150. Once the vehicle computer 110 detects that the portable device 140 is activated, the vehicle computer 110 authenticates the portable device, as set forth above, to prevent an unauthorized control of the vehicle 105. Once the portable device is authenticated, the vehicle computer 110 may detect the steering input. For example, the portable device 140 can transmit data, e.g., via Bluetooth, Wi-Fi, or some other wireless protocol, to the vehicle computer 110 specifying the steering input.

A user can activate the portable device 140 to control the vehicle 105, e.g., by opening a ReTMA application on the portable device 140, pressing the icon 160, and providing a substantially continuous motion input to the first region 150. That is, the portable device 140 can control the vehicle 105 only upon the ReTMA application being opened and the user pressing the icon 160 in the second region 155 while providing a substantially continuous motion input in the first region 150. After activating the portable device 140, the vehicle computer 110 authenticates the portable device, and then operates the vehicle 105 based on the steering input. The user can direct the vehicle using the portable device 140. In other words, the portable device can receive user input and transmit data representing the user input to the vehicle computer 110. For example, when the user provides a steering input, the portable device 140 transmits a signal to the vehicle computer 110. Upon receiving the signal, the vehicle computer 110 is programmed to actuate vehicle components 125 based on the steering input. For example, the vehicle computer 110 is programmed to actuate the steering controller to operate the steering component 125 in one of the straight position, the left-turn position, or the right-turn position, respectively. In this situation, the user can control the vehicle 105 to maneuver the trailer 106.

Additionally, the user can select the transmission gear and a vehicle speed prior to the vehicle computer 110 operating the vehicle 105. In this situation, the portable device 140 transmits a signal to the vehicle computer 110, which can actuate the transmission controller to engage the transmission component 125 in one of the drive gear or the reverse gear based on the gear selector 165. Also, the portable device 140 transmits a signal to the vehicle computer 110, which can actuate the actuate the propulsion component 125 to operate the vehicle at a vehicle speed based on the speed selector 170. The vehicle computer 110 is programmed to adjust the vehicle speed during operation of the vehicle 105 based on the trailer angle.

The user can deactivate the portable device 140 once the trailer 106 is maneuvered to the desired location, e.g., by closing a ReTMA application on the portable device 140, by releasing the icon 160, or by removing the finger from the first region 150. The vehicle computer 110 is programmed to actuate the brake component 125 to stop the vehicle 105 when the portable device 140 is deactivated.

Figure 4:
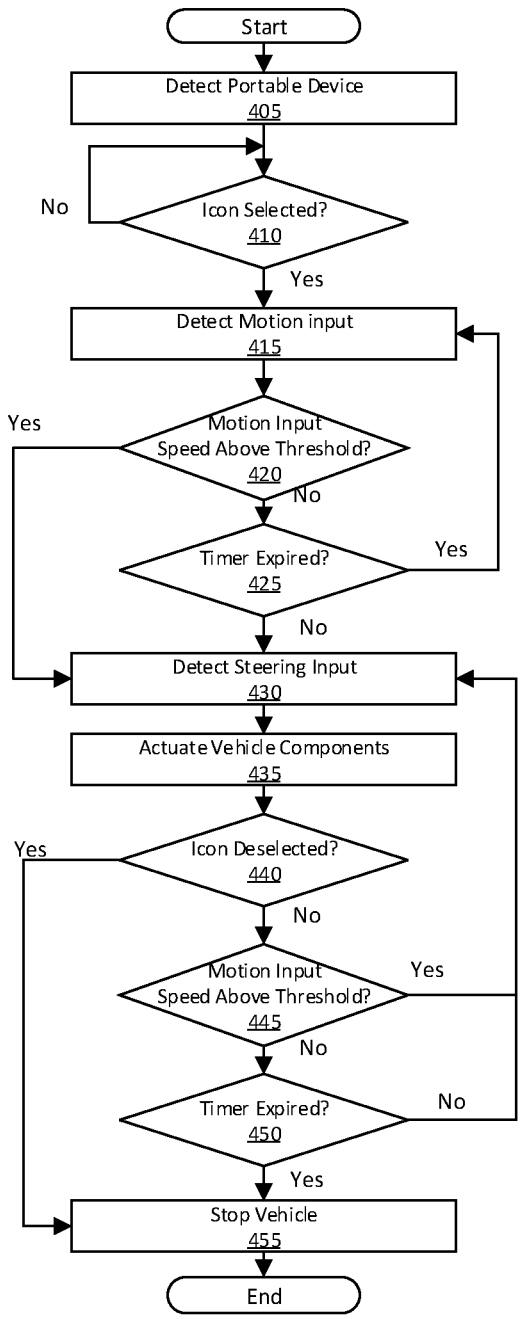
FIG. 4 is a flow chart of an exemplary process to maneuver the vehicle and a trailer with the portable device.

FIG. 4 illustrates an exemplary process 400 that can be implemented in the vehicle computer 110 to receive the steering input in a second region 155 while detecting a substantially continuous motion input into the first region 150 and to operate the vehicle 105 based on the steering input.

The process 400 begins in a block 405, in which the vehicle computer 110 detects the portable device 140. For example, the portable device 140 can transmit data including commands to (and receive data from) the vehicle computer 110, e.g., through wireless communications, when the portable device 140 is activated. In other words, the activation of the portable device 140 initiates communication between the portable device 140 and the vehicle computer 110, e.g., sending of a "handshake" request in which the portable device 140 transmits a wireless message to the vehicle computer 110 asking for a response and initiation of an authentication protocol; the vehicle computer 110 can respond acknowledging the activation or initiation message from the portable device 140, whereupon the vehicle computer 110 can authenticate the portable device 140 according to conventional authentication mechanisms such as exchange of security keys that can be used in conjunction with a stored private key, user input of a password, or the like, biometric authentication of a user of the portable device 140, etc.

The portable device 140 is typically activated when the user opens a ReTMA application on the portable device 140. When the ReTMA application is operating on the portable device 140, the vehicle computer 110 can authenticate the portable device 140 to prevent an intruder computer from operating the vehicle 105. Once the portable device 140 is activated and authenticated, the vehicle computer 110 can control the vehicle based on a steering input transmitted from the portable device 140. If the portable device 140 is activated and authenticated, then the process 400 continues to a decision block 410. Otherwise, the process 400 remains in the block 405.

Next, in the decision block 410, the vehicle computer 110 determines whether the icon 160 is selected in the second region 155 of the touchscreen 145. For example, the user can press a finger against the icon 160 to select the icon 160. The portable device 140 can transmit a message to the vehicle computer 110 indicating the icon 160 is selected. If the icon 160 is selected, then the process 400 continues in a block 415. Otherwise, the process 400 remains in the decision block 410.

In the block 415, the vehicle computer 110 detects a motion input provided to the portable device 140. For example, the first region 150 of the touchscreen 145 can receive the motion input from a user's finger. The portable device 140 can transmit the motion input to the vehicle computer 110. Additionally, the portable device can determine a speed of the motion input. In these circumstances, the portable device 140 can transmit the speed of the motion input to the vehicle computer 110.

Next, in a decision block 420, the vehicle computer 110 determines whether the speed of the motion input is above a threshold. For example, the vehicle computer 110 compares the speed of the motion input to the threshold. When the speed of the motion input is above the threshold, the vehicle computer 110 determines the motion input is a substantially continuous motion input. When the speed of the motion input is below the threshold, the vehicle computer 110 determines the motion input is a discontinuous motion input. Alternatively, the portable device 140 can compare the speed of the motion input to the threshold and transmit a message to the vehicle computer 110 identifying whether the motion input is a substantially continuous motion input or a discontinuous motion input. If the speed of the motion input is above the threshold, then the process 400 continues in a block 430. Otherwise, the process 400 continues in a decision block 425.

In the decision block 425, the vehicle computer 110 determines whether a timer has expired. The timer, as explained above, is activated when the speed of the motion input is below the threshold. The timer begins when the speed of the motion input decreases below the threshold. The vehicle computer 110 can determine the speed of the motion input increases above the threshold prior to the expiration of the timer. In these circumstances, the user can increase the speed of the motion input prior to the expiration of the timer. When the speed of the motion input increases above the threshold prior to the expiration of the timer, the vehicle computer 110 determines the motion input is a substantially continuous motion input. If the speed of the motion input remains below the threshold when the timer expires, then the vehicle computer 110 determines the motion input is a discontinuous motion input. Alternatively, the timer can be in the portable device 140. For example, a processor of the portable device 140 can be programmed to determine that the speed of the motion input increases above the threshold prior to the expiration of the timer. If the speed of the motion input increases above the threshold prior to the expiration of the timer, then the process 400 continues in the block 430. Otherwise, the process 400 returns to the block 415.

In the block 430, the vehicle computer 110 detects a steering input, which includes a steering direction and a steering angle. For example, the vehicle computer 110 determines a distance and a direction the icon 160 moves relative to the longitudinal axis A of the touchscreen 145. The vehicle computer 110 determines the steering direction based on the direction the icon 160 moves relative to the longitudinal axis A of the touchscreen 145. For example, the user may move the icon 160 to the right or to the left of the longitudinal axis A of the touchscreen 145. In these circumstances, the portable device 140 transmits the direction the icon 160 moves relative to the longitudinal axis A of the touchscreen 145 to the vehicle computer 110. Alternatively, the portable device 140 can determine the steering direction and transmit the steering direction to the vehicle computer 110.

Additionally, the vehicle computer 110 determines the steering angle based on the distance the icon 160 moves relative to the longitudinal axis A of the touchscreen 145. For example, the steering angle is zero when the icon 160 is on the longitudinal axis A of the touchscreen 145. When the distance the icon 160 moves relative to the longitudinal axis A of the touchscreen 145 increases, the steering angle increases, and when the distance the icon 160 moves relative to the longitudinal axis A of the touchscreen 145 decreases, the steering angle decreases. That is, when the icon 160 moves towards the longitudinal axis A of the touchscreen 145, the steering angle decreases, and when the icon 160 moves away from the longitudinal axis A of the touchscreen 145, the steering angle increases. The user may move, e.g., rotate, slide, etc., the icon 160 relative to the longitudinal axis A of the touchscreen 145. In these circumstances, the portable device 140 transmits the distance the icon 160 moves relative to the longitudinal axis A of the touchscreen 145 to the vehicle computer 110. Alternatively, the portable device 140 can determine the steering angle and transmit the steering angle to the vehicle computer 110.

Next, in a block 435, the vehicle computer 110 actuates vehicle components 125 to move the vehicle based on the steering input. For example, the vehicle computer 110 is programmed to actuate the steering component 125 to turn the vehicle 105 based on the steering input. When the icon 160 is on the longitudinal axis A, the vehicle computer 110 is programmed to actuate the steering component 125 to the straight position, e.g., to operate the vehicle 105 along a substantially straight path. When the icon 160 is moved relative to the longitudinal axis A of the touchscreen 145, the vehicle computer 110 is programmed to actuate the steering component 125 to one of the left-turn position or the right-turn position, e.g., to turn the vehicle 105 in the direction the icon 160 is moved relative to the longitudinal axis A of the touchscreen 145.

Additionally, the vehicle computer 110 is programmed to actuate a transmission component 125. For example, the vehicle computer 110 actuates the transmission controller to engage the transmission component 125 in one of a drive gear or a reverse gear, e.g., based on a gear selector 165. In these circumstances, the user can select one of a drive gear and a reverse gear via the gear selector 165, which is displayed on the touchscreen 145 when the vehicle 105 is stopped. The vehicle 105 can be propelled forward when the transmission component 125 is in the drive gear, and the vehicle 105 can be propelled backwards when the transmission component 125 is in the reverse gear.

Further, the vehicle computer 110 is programmed actuate a propulsion component 125. For example, the vehicle computer 110 actuates the propulsion component to operate the vehicle 105 at a vehicle speed, e.g., based on at least one of a speed selector 170 and a trailer angle. In these circumstances, the user can select a vehicle speed, as discussed above, via the speed selector 170, which is displayed on the touchscreen 145 when the vehicle 105 is stopped. Additionally, the vehicle computer 110 is programmed to operate the vehicle 105 at a vehicle speed based on the trailer angle. The vehicle computer 110 receives the trailer angle from the trailer sensor 115 and compares the trailer angle to a threshold. When the trailer angle is below the threshold, the vehicle computer 110 is programmed to operate the vehicle 105 at a vehicle speed at or below an upper speed limit. When the trailer angle is below the threshold. the vehicle computer 110 is programmed to operate the vehicle 105 at a vehicle speed at or below a lower speed limit.

Next, in a decision block 440, the vehicle computer 110 determines whether the icon 160 is deselected in the second region 155 of the touchscreen 145. For example, the user can release the icon 160, i.e., remove the finger from touching the touchscreen 145. The portable device 140 can transmit a message to the vehicle computer 110 indicating the icon 160 is deselected, i.e., released. If the icon 160 is deselected, then the process 400 continues in a block 455. Otherwise, the process 400 continues in a decision block 445.

In the decision block 445, the vehicle computer 110 determines whether the speed of the motion input is above a threshold. For example, the vehicle computer 110 compares the speed of the motion input to the threshold. When the speed of the motion input is above the threshold, the vehicle computer 110 determines the motion input is a substantially continuous motion input. When the speed of the motion input is below the threshold, the vehicle computer 110 determines the motion input is a discontinuous motion input. Alternatively, the portable device 140 can compare the speed of the motion input to the threshold and transmit a message to the vehicle computer 110 identifying whether the motion input is a substantially continuous motion input or a discontinuous motion input. If the speed of the motion input is above the threshold, then the process 400 returns to the block 430. Otherwise, the process 400 continues in a decision block 450.

In the decision block 450, the vehicle computer 110 determines whether a timer has expired. The timer, as explained above, is activated when the speed of the motion input is below the threshold. The timer begins when the speed of the motion input decreases below the threshold. The vehicle computer 110 can determine the speed of the motion input increases above the threshold prior to the expiration of the timer. In these circumstances, the user can increase the speed of the motion input prior to the expiration of the timer. When the speed of the motion input increases above the threshold prior to the expiration of the timer, the vehicle computer 110 determines the motion input is a substantially continuous motion input. If the speed of the motion input remains below the threshold when the timer expires, then the vehicle computer 110 determines the motion input is a discontinuous motion input. Alternatively, the timer can be in the portable device 140. For example, a processor of the portable device 140 can be programmed to determine that the speed of the motion input increases above the threshold prior to the expiration of the timer. If the speed of the motion input increases above the threshold prior to the expiration of the timer, then the process 400 returns to the block 430. Otherwise, the process 400 continues to the block 455.

In the block 455, the vehicle computer 110 actuates vehicle components 125 to stop the vehicle 105. For example, the vehicle computer 110 is programmed to actuate a brake controller to engage a brake component 125 to reduce the vehicle speed until the vehicle 105 stops. Additionally, the vehicle computer 110 is programmed to actuate the steering component 125 to operate in the straight position. The process ends following the block 445.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   detecting a continuous motion input in a first region of a touchscreen of a portable device in communication with a vehicle;
   determining a speed of the continuous motion input;
   detecting a steering input from a second region of the touchscreen;
   wherein the continuous motion input is an input of a line that has a distance increasing with time, and the speed of the continuous motion input is, and remains, above a threshold, or the speed of the continuous motion input is nonzero but is below the threshold for less than a predetermined time; and
   actuating a steering component of the vehicle based on the steering input while the continuous motion input remains above the threshold, or the speed of the continuous motion input is nonzero but is below the threshold for less than the predetermined time.

2. The method of claim 1, further comprising, upon detecting the vehicle is stopped, displaying at least one of a gear selector and a speed selector in the second region.

3. The method of claim 1, further comprising actuating a propulsion component of the vehicle based on detecting a selection of an icon in the second region and detecting the continuous motion input in the first region.

4. The method of claim 3, further comprising actuating a brake component of the vehicle based on at least one of detecting a discontinuous motion input in the first region and detecting deselection of the icon in the second region.

5. The method of claim 3, further comprising operating the vehicle at a vehicle speed below an upper speed limit.

6. The method of claim 3, further comprising operating the vehicle at a vehicle speed below a lower speed limit based on detecting a trailer angle above a threshold.

7. The method of claim 1, further comprising, upon detecting a selection of an icon in the second region, detecting the continuous motion input in the first region.

8. The method of claim 1, wherein the steering input includes a steering direction and a steering angle.

9. The method of claim 1, further comprising, upon detecting a discontinuous motion input in the first region by determining that the speed of the continuous motion input is below the threshold for more than the predetermined time, preventing actuation of the steering component based on the steering input.

10. A system, comprising a computer including a processor and a memory, the memory storing instructions executable by the processor to:
    detect a continuous motion input in a first region of a touchscreen of a portable device in communication with a vehicle;
    determine a speed of the continuous motion input;

detect a steering input from a second region of the touchscreen;

wherein the continuous motion input is an input of a line that has a distance increasing with time, and the speed of the continuous motion input is, and remains, above a threshold, or the speed of the continuous motion input is nonzero but is below the threshold for less than a predetermined time; and actuate a steering component of the vehicle based on the steering input while the continuous motion input remains above the threshold, or the speed of the continuous motion input is nonzero but is below the threshold for less than the predetermined time.

11. The system of claim 10, wherein the instructions further include instructions to, upon detecting the vehicle is stopped, display at least one of a gear selector and a speed selector in the second region.

12. The system of claim 10, wherein the instructions further include instructions to actuate a propulsion component of the vehicle based on detecting a selection of an icon in the second region and detecting the continuous motion input in the first region.

13. The system of claim 12, wherein the instructions further include instructions to actuate a brake component of the vehicle based on at least one of detecting a discontinuous motion input in the first region and detecting deselection of the icon in the second region.

14. The system of claim 12, wherein the instructions further include instructions to operate the vehicle at a vehicle speed below an upper speed limit.

15. The system of claim 12, wherein the instructions further include instructions to operate the vehicle at a vehicle speed below a lower speed limit based on detecting a trailer angle above a threshold.

16. The system of claim 10, wherein the instructions further include instructions to, upon detecting a selection of an icon in the second region, detect the continuous motion input in the first region.

17. The system of claim 10, wherein the steering input includes a steering direction and a steering angle.

18. The system of claim 10, wherein the instructions further include instructions to, upon detecting a discontinuous motion input in the first region by determining that the speed of the continuous motion input is below the threshold for more than the predetermined time, prevent actuation of the steering component based on the steering input.

19. The system of claim 10, wherein a vehicle computer controls a vehicle speed based at least in part on the speed of the continuous motion input.

* * * * *